United States Patent [19]

Hart et al.

[11] Patent Number: 5,484,488
[45] Date of Patent: Jan. 16, 1996

[54] METHODS FOR MELTING AND DISPERSING PARAFFIN WAX IN OIL FIELD PRODUCTION EQUIPMENT

[75] Inventors: Paul R. Hart; J. Michael Brown, both of The Woodlands, Tex.

[73] Assignee: BJ Services Company, U.S.A., Houston, Tex.

[21] Appl. No.: 223,919

[22] Filed: Apr. 6, 1994

[51] Int. Cl.⁶ .................................. B08B 9/02; B08B 9/08
[52] U.S. Cl. ................................ 134/22.13; 134/22.14; 134/22.17; 134/22.18; 134/22.19; 134/27; 134/40; 166/304; 166/311; 507/90
[58] Field of Search ...................... 134/3, 5, 22.13, 134/22.14, 22.17, 22.18, 22.19, 27, 40; 166/304, 311; 507/90

[56] References Cited

U.S. PATENT DOCUMENTS

| | | | |
|---|---|---|---|
| 3,773,465 | 11/1973 | Keeney et al. | 134/3 X |
| 3,914,132 | 10/1975 | Sutton | 134/40 |
| 4,089,703 | 5/1978 | White | 134/22.13 |
| 4,414,035 | 11/1983 | Newberry et al. | 134/3 |
| 4,455,175 | 6/1984 | Settineri et al. | 134/5 |
| 4,693,312 | 9/1987 | Lenderman | 166/269 |
| 4,755,230 | 7/1988 | Ashton et al. | 134/22.14 |
| 4,813,482 | 3/1989 | Walton | 166/267 |

*Primary Examiner*—David L. Lacey
*Assistant Examiner*—Sean Vincent
*Attorney, Agent, or Firm*—Charles D. Gunter, Jr.

[57] ABSTRACT

Methods for removing paraffin wax deposits from the surfaces of oilfield production equipment during oil production by melting and subsequently dispersing the deposits. These methods utilize an acid compound and a neutralizer compound which react exothermally to melt the deposit and form a dispersant to remove the melted fragments of the deposit.

15 Claims, No Drawings

5,484,488

METHODS FOR MELTING AND DISPERSING PARAFFIN WAX IN OIL FIELD PRODUCTION EQUIPMENT

FIELD OF THE INVENTION

The present invention pertains to methods for melting and dispersing paraffin waxes in oilfield production equipment.

BACKGROUND OF THE INVENTION

Crude oils and other heavier petroleum fractions often contain paraffinic materials. The major constituents of these paraffinic waxes contain long-chain normal alkyl regions. These waxy compounds will readily crystallize out upon cooling of the oil fraction containing them. This can result in deposits which obstruct the flow of oilfield production fluids. These deposits need to be removed from the flowlines and vessels to achieve more production of petroleum.

Various means for removing paraffin wax have been utilized. Sulfur trioxide has been used to contact the paraffin and form a dispersible material that is removed with an aqueous liquid and a surfactant. Other solvents and dispersants such as a copolymer of a primary alcohol and ethylene oxide with sodium silicate and N-substituted succinimide ethers have been tried. U.S. Pat. No. 4,813,482 teaches injecting a mixture of an alkyl or aralkyl polyoxyalkylene phosphate ester surfactant in free acid form or as a salt with a mutual solvent and water to remove paraffin deposits. This mixture must be at a temperature greater than the melting point of the wax to be effective. Since none of these processes melt the wax, they can only slowly eat away at its surface. This is not fast enough at most realistic surface to volume ratios. Furthermore, they create dispersions in water which must be disposed of or otherwise expensively dealt with.

U.S. Pat. No. 4,755,230 teaches the use of inorganic nitrate/nitrite compounds in redox reactions which result in an exotherm which melts the paraffin deposit and generates nitrogen gas. This does melt the wax, but requires the use of water to deliver the reactants, so that if the wax disperses at all, which it may well not, it does so into water which then must be expensively dealt with. Furthermore, gas generating redox reactions tend to be self accelerating, rendering them at best kinetically unpredictable, at worst explosive.

SUMMARY OF THE INVENTION

Disclosed are methods for removing paraffin wax deposits which can occur in oilfield production fluids and can obstruct flow of the fluids both downhole and in surface equipment. An exothermic reaction is caused at the site of the deposit which melts the deposit and creates as a product of the reaction a dispersant which can clear the deposit and prevent reposition of the wax downstream even after the heat has dissipated.

DESCRIPTION OF THE RELATED ART

Historically, polymers have been used as paraffin inhibitors in crude oils. U.S. Pat. No. 4,693,312 teaches a method of adding a pour point depressant to an oil producing formation so the pour point depressant can slowly dissolve in the oil. These methods comprise adding an emulsion breaking compound into the formation which breaks an aqueous dispersion of the pour point dispersant when it is subsequently injected. An ethylene vinyl acetate copolymer may be employed as the pour point depressant. Alternatively, such wax modifiers can be added in organic solvent to inhibit the deposition of wax. Such methods and agents are not by themselves useful for removing such deposits once they have formed however.

DETAILED DESCRIPTION OF THE INVENTION

The present invention relates to methods for removing paraffin wax deposits from the surfaces of oilfield production equipment during oil production by melting and subsequently dispersing the deposits comprising adding to the oil an acidic compound which flows to the deposit. An alkaline, neutralizer compound is sequentially added to the oil which chemically reacts with the acid in an exothermic reaction that generates both heat and an organic salt. The heat generated melts the deposit and the organic salt acts as a dispersant and disperses the fragments of the deposit and inhibits them from redepositing downstream of the original deposit.

The acids useful in this invention include inorganic acids, such as $H_3PO_4$, $H_2SO_4$, and HCl, especially when neutralized with an organic amine or polyamine, such as $R_1R_2N(R_3R_4N)_xR_5$, where $R_{1-5}$ are H, $C_1$ to $C_{30}$ alkyl or aryl hydrocarbons or similar hydrocarbonaceous, e.g., ether, groups and x is 0 to 1000; and organic acids and polyacids, such as $R_1R_2CA(R_3CA)_xR_4$, where $R_1$, $R_2$, $R_3$, $R_4$ are H, or $C_1$ to $C_{30}$ alkyl or aryl hydrocarbons or similar hydrocarbonaceous groups, A is $-CO_2H$, $-SO_3H$, $-OPO_3H_2$, $-PO_3H_2$, and x is 0 to 1000.

The preferred acids are alkylaryl sulfonic acid compounds such as branched or linear dodecylbenzene sulfonic acid, dinonyl or isopropyl naphthalene sulfonic acids, and blends of the above compounds.

The neutralizer compound can be any alkaline compound that will neutralize the acid. The neutralizer compounds include MgO, NaOH, KOH, $MgCO_3$, $NaHCO_3$, $Na_2CO_3$, $R_1R_2C_2O_2Na$ $(R_3C_2O_2Na)_xR_4$, and $R_1R_2N(R_3R_4H)_xR_5$, where $R_1$, $R_2$, $R_3$, $R_4$, and $R_5$ are H, or $C_1$ to $C_{30}$ alkyl, aryl or similar hydrocarbonaceous group, and x is 0 to 1000. Preferably, the neutralizer is an alkylamine or polyamine of the last class.

The dispersant salts thus formed include alkali metal, ammonium, and organic amine salts of inorganic and organic acids. The more hydrophilic salts (metal or ammonium containing cations and/or inorganic anions) and solvents (water, glycol) are more effective on the more hydrophilic, emulsified waxes that form when more produced water is present, and the more lipophilic salts (containing alkylamines or polyamines and/or organic acids) and solvents (hydrocarbon, chlorocarbon) are more effective on the more lipophilic, oily waxes that form when little produced water is present.

The organic components can be added to the oil neat or in an organic solvent. This solvent can be a chlorocarbon solvent such as methylene dichloride or carbon disulfide if it must fall through the crude oil to the equipment or it can be a hydrocarbon solvent such as crude oil, kerosene, toluene and dipentene if it can be pumped directly to the deposit, as for surface equipment.

The inorganic component can be added to the oil in any suitable solvent. This solvent can be aqueous, alcoholic such as methanol, ethanol and ethylene glycol or other polar solvent.

The present invention is employed in a fashion so that the acidic and basic components arrive at the deposit contemporaneously. The timing of addition is dependent upon the solvent employed and the distance from the addition point to the point of the paraffin wax deposit. Least efficiently, but most easily, the two components are mixed together at the injection point and the thermal plume carries downstream to the point of the paraffin wax deposit. The acidic and basic components can be added to the oil or equipment in either order except that, to meet up at some point downhole, the denser component, as solvated, must be added later.

The neutralizer compound and the acidic compound are added in stoichiometric, equal equivalent amounts at a total amount that will ensure that they will create the necessary heat and amount of dispersant to effect removal of the deposit. The combined amount depends on the amount, hardness, melting point, and dispersion properties of the wax. The former is easy to calculate for each product and the latter is easy to determine empirically for each application. Preferably, the acid compound and the neutralizer compound are added to the equipment in an amount from about 2% to 100 times the weight of the wax deposit to be removed. For example, when the acid compound is dodecylbenzene sulfonic acid and the neutralizer compound is isopropylamine, they are reacted in a weight ratio of about 5 to 1, respectively, and added at a combined amount equal to between 25 and 50% of a Gulf of Mexico crude oil containing 0.67% of rock hard wax cut from the pipe with a wire line.

The invention will now be further illustrated by the following examples which are included as being illustrative of the invention and which should not be construed as limiting the scope thereof.

EXAMPLES

Heat Generation Test

To determine thermal efficiency, 100 g dodecylbenzenesulfonic acid, 19 g isopropylamine and 131 g mineral oil were placed in a Dewar flask. This created an exotherm that raised the temperature from 75° F. to 213° F., hot enough to melt most any natural paraffin wax.

Wax Deposit Dissolution Test

To determine dispersion efficiency, 75 mL of crude oil from an offshore refinery was added to a sampling jar along with 0.5 g of wax (very hard wire line cutting). This mixture was adjusted to deposit temperature in roughly 10 minutes. The exothermal dispersant components were then added to this mixture replacing 25% and 50% of the crude oil by weight.

This sample was then shaken in an insulated shaker box for 30 minutes at low setting. The sample was then centrifuged for 10 minutes. The centrifuged mixture was then allowed to drain for 10 minutes. The walls of the sampling jar were rinsed gently with 10 mL of a 1:1 mixture of heptane:toluene. The resulting remains of wax were then weighed to determine the efficacy of the treatment at dissolving and maintaining dispersion of the wax. The results of this testing are presented in Table I.

TABLE I

Wax Deposit Dissolution Test: 0.5 g wire line cutting deposit added back into 75 mL offshore Gulf crude oil. Treatment is 5 parts dodecylbenzene-sulfonic acid and 1 part isopropylamine ("exothermic dispersant").

TABLE I

Wax Deposit Dissolution Test: 0.5 g wire line cutting deposit added back into 75 mL offshore Gulf crude oil. Treatment is 5 parts dodecylbenzenesulfonic acid and 1 part isopropylamine ("exothermic dispersant").

| Treatment | weight of residue (g) | max. temp (°F.) | Type of residue |
|---|---|---|---|
| Blank | 0.58 | 75 | all deposit on bottom, no fluid on sides. |
| 25% exothermic | 0.61 | 144 | less deposit on bottom than with no treatment, but with more thick fluid on sides. |
| 50% exothermic Dispersant | 0.10 | 213 | no deposit on bottom, all weight is thick fluid on sides. |
| Comparative Example 100% xylene (no crude) | 0.58 | 75 | softened and swelled deposit but little dissolved, no fluid on sides. |
| No deposit added | 0.11 | 75 | all of deposit is on bottom, no fluid on sides. |

The results of this testing show that a 50% solution of the invented treatment is effective at removing the paraffin wax deposit. This proved more effective than traditional means of removing wax deposits such as soaking in xylene.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for removing paraffin wax deposits from the surfaces of oilfield production equipment during oil production by melting and subsequently dispersing said deposits comprising:

adding to oil in said equipment an acidic compound, whereby said acidic compound flows to said deposits;

adding to oil in said equipment a neutralizer compound, whereby said neutralizer compound flows to said deposits and chemically reacts with said acidic compound thereby generating heat sufficient to melt said paraffin wax deposits, and forms an organic salt which disperses said deposits into the oil; and wherein at least one of said acidic compound and said neutralizer compound is an organic compound.

2. The method as claimed in claim 1 wherein said neutralizer compound is added to said oil in said equipment before or after addition to said oil of said acid, or simultaneously with said acid, and mixed in situ.

3. The method as claimed in claim 1 wherein said acid is selected from the group consisting of $H_3PO_4$, $H_2SO_4$ and HCl, and the neutralizer is selected from the group consisting of $R_1R_2C_2O_2Na(R_3C_2O_2Na)xR_4$, and $R_1R_2N$ $(R_3R_4H)xR_5$, where $R_1$, $R_2$, $R_3$, $R_4$, and $R_5$ are H, or $C_1$ to $C_{30}$ alkyl, aryl or hydrocarbon containing group provided not all are H, and x is 0 to 1000.

4. The method as claimed in claim 3 wherein said acid is selected from the group consisting of branched or linear dodecylbenzene sulfonic acid, and dinonyl or isopropyl naphthalene sulfonic acid.

5. The method as claimed in claim 3 wherein said acid is dodecylbenzene sulfonic acid.

6. The method as claimed in claim 1 wherein said neutralizer compound is selected from the group consisting of MgO, NaOH, KOH, $MgCO_3$, $NaHCO_3$, $Na_2CO_3$, and the acid is selected from the group consisting of $R_1R_2CA(R_3CA)_xR_4$, where $R_1$, $R_2$, $R_3$, and $R_4$ are H, or $C_1$ to $C_{30}$ alkyl or aryl hydrocarbons or hydrocarbon containing group provided not all are H, A is $-CO_2H$, $-SO_3H$, $-OPO_3H_2$, $-PO_3H_2$ and x is 0 to 1000.

7. The method as claimed in claim 6 wherein said neutralizer compound is isopropylamine.

8. The method as claimed in claim 1 wherein said acid and said neutralizer compound are added to said oil in said equipment in a solvent.

9. The method as claimed in claim 8 wherein said solvent is a hydrocarbon compound selected from the group consisting of crude oil, kerosene, toluene, and dipentene.

10. The method as claimed in claim 8 wherein said solvent is a non-polar liquid selected from the group consisting of carbon disulfide and methylene dichloride.

11. The method as claimed in claim 8 wherein said solvent is a polar solvent selected from the group consisting of water, methanol, ethanol, and ethylene glycol.

12. The method as claimed in claim 1 wherein said acid compound and said neutralizer compound are added to said oil in said equipment in an amount from about 2% to 100 times the weight of said wax deposits to be removed, and wherein said amount is the least needed to raise the temperature sufficiently to fluidize said wax deposits.

13. The method as claimed in claim 1 wherein said neutralizer compound is added to said oil in said equipment in an amount necessary to completely neutralize the acid.

14. The method as claimed in claim 1 wherein said equipment is crude oil flow lines, pipelines, separators, and tanks.

15. The method of claim 1, wherein said acid is selected from the group consisting of $R_1R_2CA(R_3CA)_xR_4$, where $R_1$, $R_2$, $R_3$, and $R_4$ are H, or $C_1$ to $C_{30}$ alkyl or aryl hydrocarbons or hydrocarbon containing group provided not all are H, A is $-CO_2H$, $-SO_3H$, $-OPO_3H_2$, $-PO_3H_2$ and x is 0 to 1000, and the neutralizer is selected from the group consisting of $R_1R_2C_2O_2Na(R_3C_2O_2Na)xR_4$, and $R_1R_2N(R_3R_4H)xR_5$, where $R_1$, $R_2$, $R_3$, $R_4$, and $R_5$ are H, or $C_1$ to $C_{30}$ alkyl, aryl or hydrocarbon containing group provided not all are H, and x is 0 to 1000.

* * * * *